(12) United States Patent
Mansour et al.

(10) Patent No.: US 9,569,204 B2
(45) Date of Patent: Feb. 14, 2017

(54) END-TO-END CONTINUOUS INTEGRATION AND VERIFICATION OF SOFTWARE

(71) Applicants: Steve Farris Mansour, Milpitas, CA (US); Todd Paul, Woodinville, WA (US)

(72) Inventors: Steve Farris Mansour, Milpitas, CA (US); Todd Paul, Woodinville, WA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/721,651

(22) Filed: Dec. 20, 2012

(65) Prior Publication Data

US 2014/0089896 A1    Mar. 27, 2014

Related U.S. Application Data

(60) Provisional application No. 61/706,734, filed on Sep. 27, 2012.

(51) Int. Cl.
  *G06F 9/44*   (2006.01)
  *G06F 9/45*   (2006.01)
  *G06F 9/445*  (2006.01)

(52) U.S. Cl.
  CPC ............... *G06F 8/71* (2013.01); *G06F 8/447* (2013.01); *G06F 8/60* (2013.01)

(58) Field of Classification Search
  CPC ........................................................ G06F 8/71
  See application file for complete search history.

(56) References Cited

U.S. PATENT DOCUMENTS

| | | | |
|---|---|---|---|
| 5,724,273 A * | 3/1998 | Desgrousilliers et al. ... | 702/120 |
| 2002/0066077 A1* | 5/2002 | Leung ........................... | 717/126 |
| 2005/0223362 A1* | 10/2005 | Whitlock ............ | G06F 11/3672 |
| | | | 717/126 |
| 2012/0054551 A1* | 3/2012 | Gao et al. .................... | 714/38.1 |
| 2012/0180039 A1* | 7/2012 | Bravery et al. ............... | 717/178 |

* cited by examiner

*Primary Examiner* — Li B Zhen
*Assistant Examiner* — Amir Soltanzadeh
(74) *Attorney, Agent, or Firm* — Schwegman, Lundberg & Woessner, P.A.

(57) ABSTRACT

Systems and methods of end-to-end continuous integration and verification of software are described. A system comprises, for example, a provisioning service module configure to automatically retrieve source code from a source code management system. The provisioning service module further generates one or more environments. A propagation management module is configured to package the retrieved source code into a deliverable and to automatically propagate the deliverable through a pipeline comprising the one or more environments.

18 Claims, 5 Drawing Sheets

END-TO-END CONTINUOUS INTEGRATION AND VERIFICATION OF SOFTWARE

This application claims the priority benefit of U.S. Provisional Patent Application No. 61/706,734 filed Sep. 27, 2012, the entirety of which is hereby incorporated by reference herein.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2012, All Rights Reserved.

TECHNICAL FIELD

The present application relates generally to the technical field of software product development and, in one specific example, to software product and systems test automation.

BACKGROUND

Conventional software system development for large-scale distributed systems consists of several stages of activities: writing source code for a program, testing subsystems of the program using unit tests, testing the entire program in isolation to validate its behavior, and integrating the program with other programs to ensure that they interoperate properly.

BRIEF DESCRIPTION OF THE DRAWINGS

Some embodiments are illustrated by way of example and not limitation in the figures of the accompanying drawings in which.

DETAILED DESCRIPTION

Figure 1:
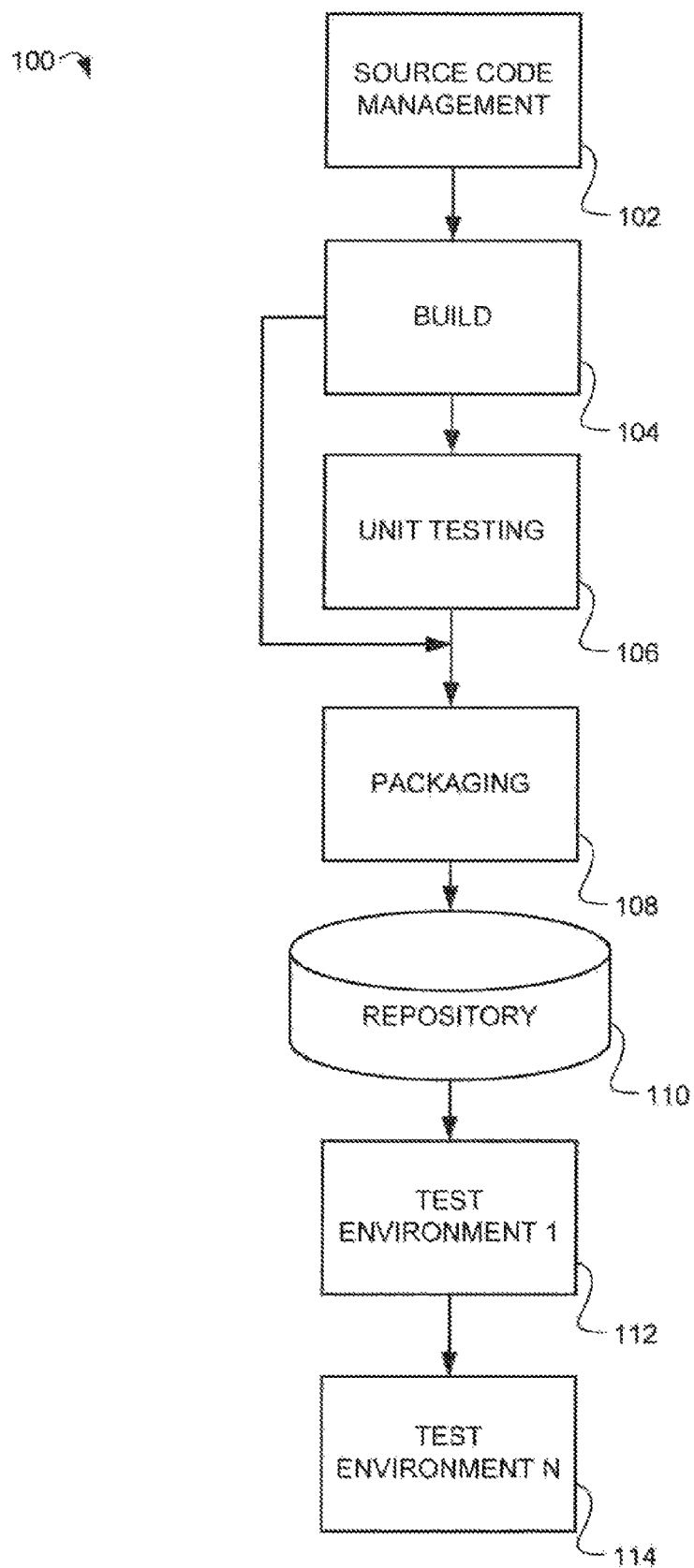
FIG. 1 is a block diagram depicting a pipeline of activity through which deliverables are propagated.

Example methods and systems to provide continuous end-to-end integration and verification of software are described. In the following description, for purposes of explanation, numerous specific details are set forth in order to provide a thorough understanding of example embodiments. It will be evident, however, to one skilled in the art that the present invention may be practiced without these specific details.

Typically, software code is manually propagated through a pipeline from initial source code to deliverable. The manual propagation may be difficult to manage and prone to causing mistakes. Other complications may arise, for example, problems are found with the deliverables in no particular order. That is, a problem in the second stage may be discovered after the deliverable has already propagated to the third or fourth stage. Problems can exist in many stages simultaneously. Each of these stages tends to be managed by a different set of people. Thus, it can be difficult to understand the exact status of a deliverable. In a large distributed system, many environments may be used for isolated and integrated testing while the deliverables are being developed. Setting the environments up and tearing the environments down is a manual labor-intensive task. Often the manual labor needed is deemed too great. Thus, certain environments are not created and some aspects of testing are avoided. This results in problems that are not detected until later in testing, or worse, after the products have been released. Further, the time required to transition from one stage to another is significant as much of the work is done manually. It can take days or even weeks to move many deliverables through all these stages in order to perform a coordinated release.

An automated mechanism for propagating a software product through the stages of its production, starting from the time the source code is checked into a source code management (SCM) system and ending with the product in a ready-to-release state is described. The test environments are automatically created when they are needed and deactivated upon completion so that compute resources are utilized, efficiently.

As used herein, a "compute resource" or "resource" refers to a physical machine or virtual machine capable of executing a deliverable. Each compute resource is assigned a unique identifier and network address. A "pool" is one or more compute resources that are identically configured and host the same deliverable. A network request to a pool can be processed by any compute resource in that pool. In the context of a pipeline, a pool will consist of a single compute resource in most cases, but it may contain multiple compute resources if needed. A "virtual machine" (VM) is a computer within a computer, implemented in software. A virtual machine emulates a complete hardware system, from processor to network card, in a self-contained, isolated software environment.

A "deliverable" refers to computer software that runs on a compute resource that directly or indirectly performs some function for the customer. Deliverables are versioned and maintained in a repository. Deliverables are typically implemented as a zipped file that includes the executable code, configuration information for the executable code, and an activation script that can configure, start, and stop the executable code. The term "pipeline" refers to a series of environments through which a software product is transformed and tested, making it ready to ship. An environment is one or more compute resources working in concert to facilitate a specific testing task for a specific software product. As each environment completes its transformations and tests, exit criteria are checked. If the product met its exit criteria it will propagate to the next stage. In a pipeline, if the product propagates through all environments then it is ready to ship.

As depicted in FIG. 1, the first stage begins with a team of software developers that are responsible for producing the source code for a software program that performs some function. An example would be a program that performs a service for other programs, like storing the data describing a transaction into a database. Another example would be a program that presents, creates, and manages user interfaces used by a user to perform a transaction such as purchasing an item. Whatever the function of the program, at stage 102, the development team writes the source code and checks it into a Source Code Management (SCM) system.

The next stage, stage 104 labelled "build", involves compiling the code into a deliverable, an executable program that can be deployed to computers for execution. To do this, the source code is read from the SCM system onto a separate machine where it is compiled into an executable program. Some development teams also supply unit tests, at optional stage 106, that execute in the context of the source code. Unit tests validate the functionality of subsystems of a program before the code is actually compiled into a fully executable program. In such cases, the unit tests are executed and, if the pass rate is acceptable, the program will be created and packaged into a deliverable, at stage 108. Some development teams skip the unit test stage. In this case, the source code is compiled directly into a deliverable. The deliverable is then stored at stage 110 and made available to other teams that need to access it for deployment and testing.

The next stage 112 involves testing the deliverable in isolation (e.g., in a "test environment 1"). This requires the existence of a testing environment where the deliverable can be deployed. Additionally, deliverables in a large distributed system can seldom function in complete isolation; they require other capabilities to exist. The other capabilities may include, for example, databases storing information required to perform a task. So, testing a deliverable in isolation typically means that the newly created deliverable is tested along with other pre-tested and known-good deliverables. In this environment, it may not be possible to test all new functionality in the deliverable because the new functionality may depend on new functionality in other deliverables, which have not yet been promoted to the known-good state. To build on the store example from above, the new functionality might be that the interlace now supports purchasing an item with a new additional credit card type. Testing in this environment might only validate that purchases can still be made with the previous credit card types.

The next stage 114 involves testing the deliverable in an environment (e.g., "test environment 2") where it is integrated with other deliverables with new functionality. The testing here would focus on the interactions between the deliverables that exercise their new functions. Continuing the example, this might be the stage in which all deliverables needed to validate support for the new credit card type are integrated for testing.

Further stages like the last one can be added as needed to cover more interactions between different deliverables. Typically, the last environment is a scaled down version of the final production environment where all deliverables reside and can be tested together.

When viewed together, these stages form a "pipeline" of activity through which the deliverables must propagate. When a deliverable propagates through its pipeline with no (or an acceptable number of) failures then it is ready to release.

Figure 2:
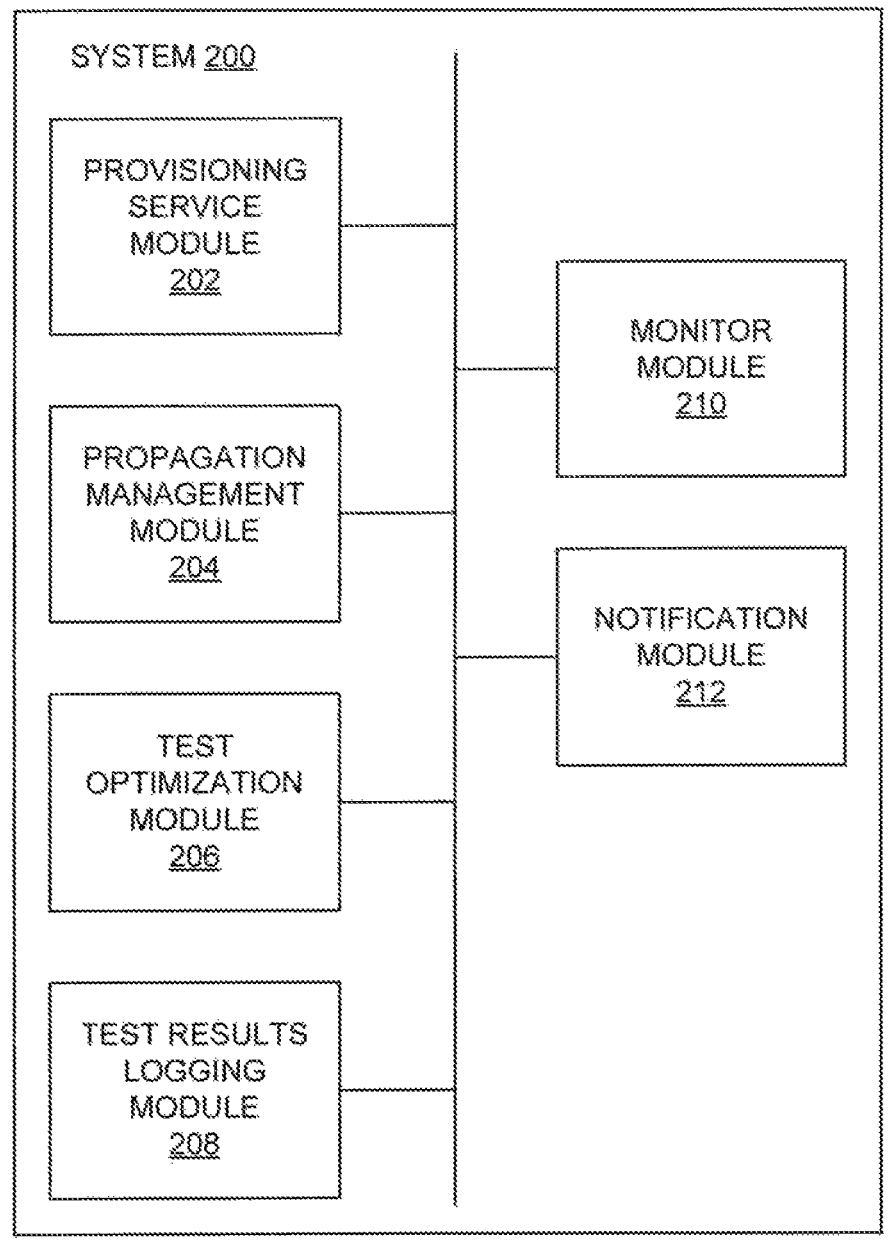
FIG. 2 is a block diagram of an example system, according to various embodiments.

FIG. 2 depicts a block diagram of an example system 200. To initiate the operation of the system 200, a user checks-in source code to the SCM system 102. At that point, the system 200 begins to manage the end-to-end continuous integration and verification of software.

A provisioning service module 202 is configured to automatically, without human intervention, retrieve or access the source code from the SCM system 102 and to automatically compile the source code into an executable program. The source code may be automatically read from the SCM system 102 onto the build system 104 where the source code is compiled into an executable program. If the environment for retrieving the source code and performing the build does not exist, the provisioning service module 202 is configured to automatically create the environment.

If the source code is assigned one or more unit tests, the unit tests are automatically executed by the provisioning service module 202. If a static source code analysis is assigned to be performed on the source code (e.g., code complexity, find bugs, and similar checks), those metrics are automatically calculated at this point. If an environment for running the unit tests and for computing the static source code metrics does not exist the provisioning service module 202 will create it.

After the unit tests are run and the initial metrics are calculated, a propagation management module 204 checks pre-defined criteria to see if the program is allowed to move to the next stage. For example, if all unit tests pass and all static metrics meet or exceed predefined thresholds, then the source code used to implement the program is packaged into a deliverable. If no unit tests or static metric thresholds are called out, the program will also be packaged into a deliverable. When the program is successfully packaged into a deliverable it will be automatically stored in the repository for the rest of the stages to access as needed.

If the test environment 1 (112) does not exist, the provisioning service module 202 generates test environment 1 (112). Creating the environment involves assigning the compute resources assigned to or specified by the environment. Once created, the environment goes through a simple cycle of tasks and repeats those tasks until it is deactivated. The first task in the cycle is to add any new pools that the environment needs and remove any pools that are no longer needed.

The second task is to check that all deliverables in the environment are the most recent versions and to determine if a newer version of a deliverable should be pulled in to the environment and deployed. There are two ways to specify how a deliverable should be updated. The simplest way is to simply update the deliverable if a newer version exists in the repository 108. The second way is to propagate a newer deliverable into the environment if it passes propagation criteria in another environment. In either case, a newer version of the deliverable will be deployed to the environment. Deployment involves copying the versioned deliverable from the repository 108 to the local environment and activating it.

The third task is to run the automated tests for the environment (e.g., test environment 1 (112)). Each environment has a pre-defined automated test suite. This test suite will be automatically executed. The actual tests that are executed may be modified by a test optimization module 206. The test optimization module 206 is configured to determine a set of tests to run based on test adequacy criteria given the changes that have occurred in the system. These changes include, but are not limited to: the source code for the deliverable, text and media content, configuration information, external services, and dependent services. The test optimization module 206 acts as a filter to provide efficiency. By reducing the number of tests that need to be run it reduces the overall end-to-end propagation time. A trivial implementation of the test optimization module 206 simply does no filtering. Test programs record their results in the test results logging module 208 to allow uniform processing of test results.

The fourth task is performed within the test environment after the test suite completes its run. The propagation management module 204 evaluates the propagation criteria. If all criteria are met, the deliverables will propagate to the next stage.

After testing and propagation are completed, the environment (e.g., test environment 1 (112)) automatically cycles back to the first task and executes everything again. This cycle continues until the environment is deactivated. Criteria can be set for when deactivation occurs. Example criteria includes: after some specified number of cycles, after some specified amount of time, after a person takes a manual step to deactivate the pipeline, and so on.

Test environment 2 (114) and subsequent test environments n operate much the same as test environment 1 (112). The only difference is that there may be deliverables in test environment 2 (114) that pass the tests in test environment 1 (112) before propagation occurs. In general, multiple environments can propagate deliverables into any given environment. The second task in the environment cycle handles this.

Pools have a property indicating whether they are static or dynamic. The deliverables on static pools remain constant. They are not updated even if a newer version of the deliverable is available in the repository 108. The deliverables on dynamic pools are updated to the latest version found in the repository 108.

The system 200 further comprises a monitor module 210 and a notification module 212. The monitor module 210 collects and provides information about the status of each deliverable and test environment. In some instances, the monitor module 210 may provide a graphical user interface that displays the propagation of the deliverable through the timeline. The notification module 212 provides push notifications and pull notifications to other monitoring systems or to administrators about the status of each deliverable and test environment.

To enable propagation, a "pipe" is introduced by the propagation management module 204. In this context, a pipe connects two stages, a "front" stage and a "to" stage. The requirements for propagation between a "from" stage and a "to" stage are: a) the propagation criteria must be met (for example, the test suite must pass with no errors) and b) all dynamic pools in the "from" stage must be consumed by dynamic pools in the "to" stage. The "to" stage may consume more deliverables than the pipe supplies. If multiple pipes propagate the same deliverable then all the deliverable versions must match before propagation occurs.

Figure 3:
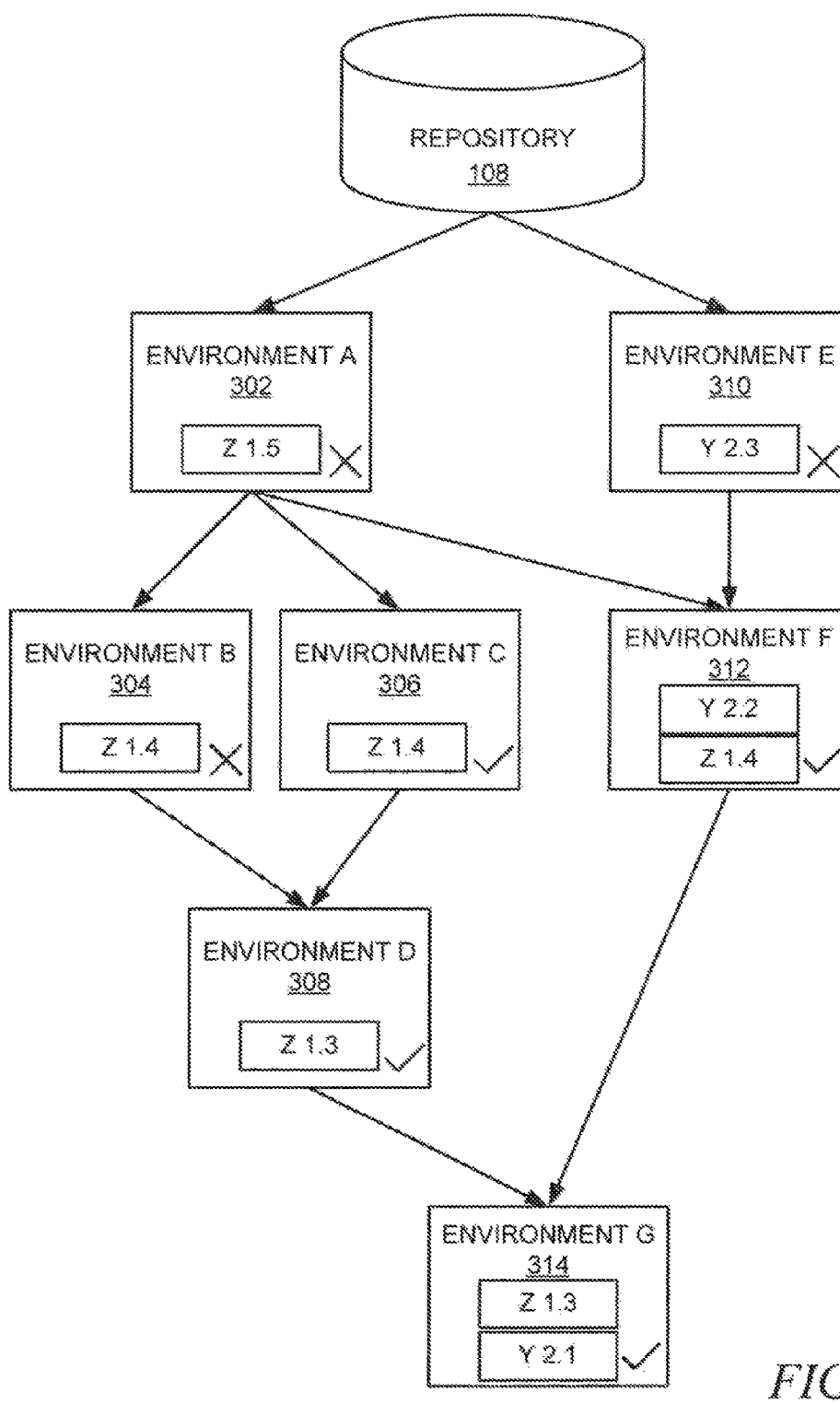
FIG. 3 is a flowchart illustrating an example method of propagation of a deliverable through a plurality of test environments, according to various embodiments.

To illustrate propagation, FIG. 3 shows environments A 302 through G 314. Each environment has one or two pools (each represented by a small box) indicating the deliverable, labelled Z or Y, and the version of the deliverable. Each environment also has either a check mark or an "X". The check mark indicates that the test suite passes with no errors. The X indicates that the test suite fails. Referring to the diagram, even though both Environment D 308 and Environment F 312 are passing their test suites, no propagation to Environment G 314 will occur because the versions of deliverable Z do not match. Environment D 308 still has deliverable Z version 1.3 because version 1.4 is failing its tests in Environment B 304.

Environment F 312 propagates two deliverables, Z and Y. Both deliverables must propagate together. Even though deliverable Y 2.2 is passing its tests, it does not propagate into Environment G 314 because both deliverables Z and Y must propagate together and deliverable Z cannot propagate because of the version mismatch between Environments D 308 and F 312.

Any dynamic pool deliverable that is not supplied via a pipe will be supplied directly from the repository 108.

Environments may use pipes to fork and join as shown in FIG. 3. When Environment A 302 passes its propagation criteria, deliverables on its dynamic pools propagate to Environments B 304 and C 306. This allows testing to be done in parallel in order to reduce the end-to-end propagation time. Similarly, Environments B 304 and C 306 must both pass their propagation criteria before their deliverables are propagated to Environment D 308. The diagram shows that Environment A 302 forks into the two environments, but it could fork into as many environments as needed. Similarly, FIG. 3 shows two environments joining at Environment D 308, but as many environments as needed could be joined.

Figure 4:
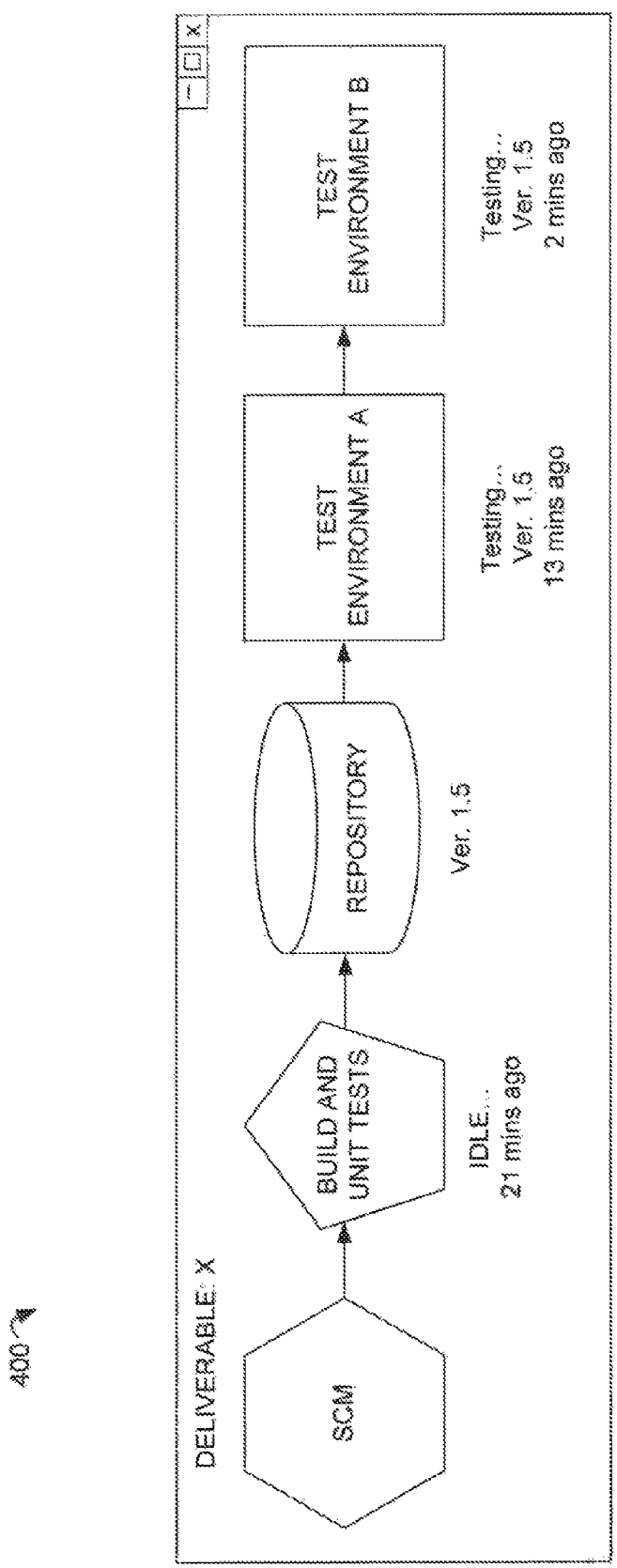
FIG. 4 depicts a portion of an example graphical user interface provided to a user.

FIG. 4 is a user interface 400 depicting an example propagation of a deliverable through a plurality of test environments. The user interface 400 may be provided by, for example, the monitor module 210. The user interface 400 depicts, according to the deliverable, the status and version of the deliverable at each point in the pipeline. In some instances, the user interface 400 may include one or more notifications provided by the notification module 212.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-read able medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporality configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 5:
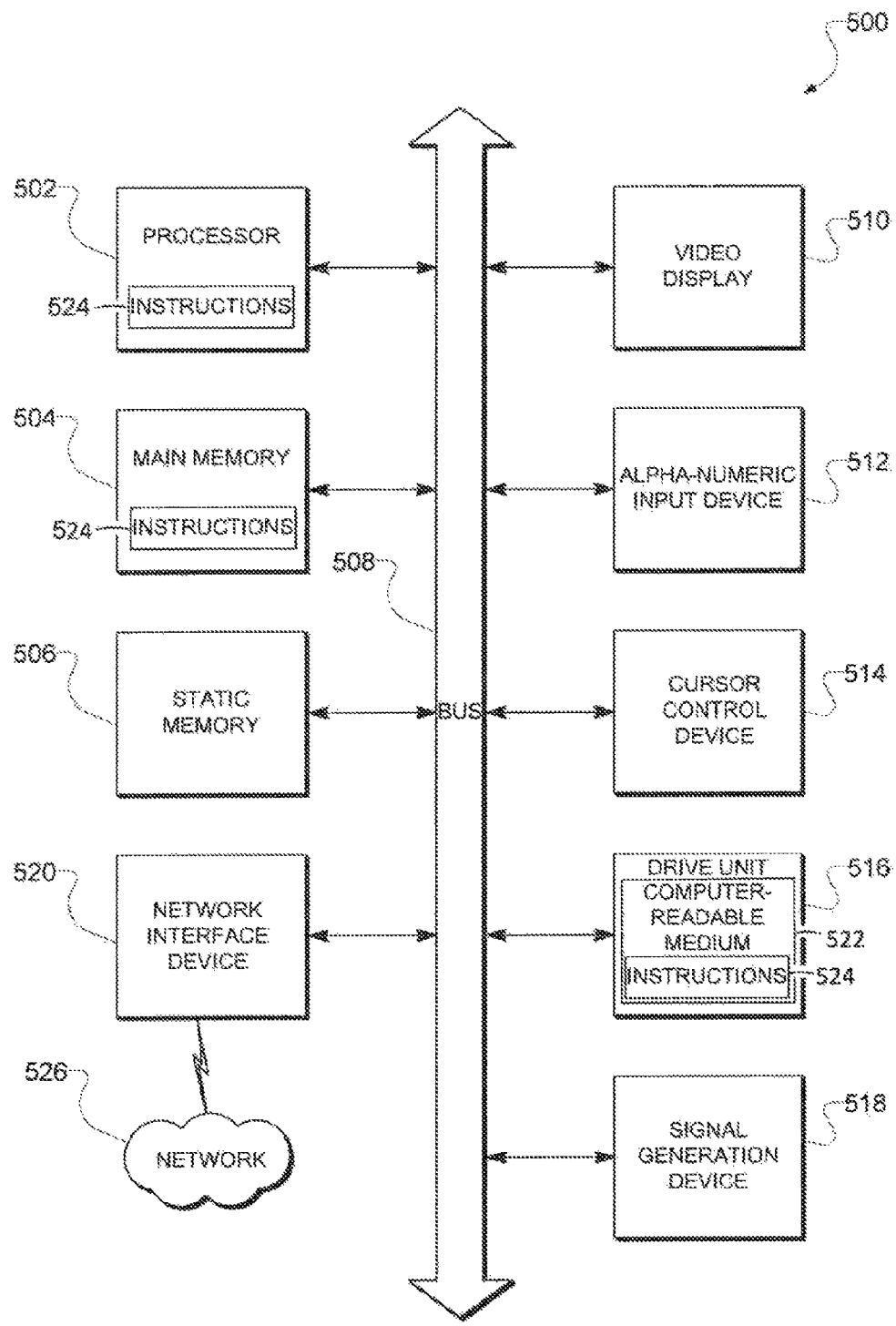
FIG. 5 is a diagrammatic representation of machine in the example form of a computer system within which a set of instructions, for causing the machine to perform any one or more of the methodologies discussed herein, may be executed.

FIG. 5 is a block diagram of machine in the example form of a computer system 500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine"shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard or a touch-sensitive display screen), a user interface (UI) navigation device 514 (e.g., a mouse), a disk drive unit 516, a signal generation device 518 (e.g., a speaker) and a network interface device 520.

Machine-Readable Medium

The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   one or more processors and executable instructions accessible on a computer-readable medium that, when executed, configure the one or more processors to at least:
   automatically retrieve source code from a source code management system;
   generate one or more environments, each environment including a resource;
   package the retrieved source code into a deliverable that is propagated through a pipeline comprising the generated one or more environments including a first environment, a second environment, and a third environment;
   determine that a first version of the deliverable from the first environment and a second version of the deliverable from the second environment each passes a test executed within their respective environments;
   detect that the first and second versions of the deliverable are both a latest version of the deliverable that passes the test executed in both the first environment and the second environment;
   introduce a pipe to connect the first and second environments to the third environment;
   automatically propagate the latest version of the deliverable from the first and second environments to a third environment within the pipeline based on the detection of the first and second versions of the deliverable; and
   cause display of the propagation of the deliverable in a user interface.

2. The system of claim 1, wherein the resource is a virtual machine.

3. The system of claim 1, wherein the deliverable comprises an activation script to configure, start, and stop executable code within the deliverable.

4. The system of claim 1, wherein the one or more processors are further configured to create the first environment of the one or more environments for retrieving and packaging the retrieved source code.

5. The system of claim 1, wherein the one or more processors are further configured to determine that the retrieved source code is assigned a unit test and to generate the second environment of the one of more environments used to run the unit test.

6. The system of claim 1, wherein the one or more processors are further configured to determine that the deliverable is allowed to pass to a next environment of the one or more environments based on pre-defined criteria.

7. The system of claim 1, wherein the deliverable is tested in one of the one or more environments.

8. The system of claim 7, wherein the testing comprises identifying the resources to perform the testing and wherein the one or more processors are further configured to add or remove resources from the one of the one or more environments based on the identification.

9. The system of claim 7, wherein the testing comprises confirming that the deliverable in the one of the one or more environments is a newer version of the deliverable.

10. The system of claim 9, wherein the newer version is identified based on propagation of the newer version of the deliverable in another environment of the one or more environments.

11. The system of claim 9, wherein the newer version is identified based on the newer version of the deliverable being stored in a repository.

12. The system of claim 7, wherein the testing comprises running an automated test suite assigned to the one environment of the one or more environments.

13. The system of claim 12, wherein the one or more processors are further configured to determine a set of tests to run as part of the automated test suite based on test adequacy criteria.

14. The system of claim 13, wherein the one or more processors are further configured to log results of the automated test suite.

15. The system of claim 7, wherein the testing further comprises evaluating propagation criteria.

16. The system of claim 1, wherein, when multiple pipes propagate the same deliverable, propagation occurring based on the deliverable versions matching.

17. A method comprising:
automatically retrieving source code from a source code management system;
generating one or more environments, each environment including a resource;
packaging the retrieved source code into a deliverable that is propagated through a pipeline comprising the generated one or more environments including a first environment, a second environment, and a third environment;
determining that a first version of the deliverable from the first environment and a second version of the deliverable from the second environment each passes a test executed within their respective environments;
detecting that the first and second versions of the deliverable are both a latest version of the deliverable that passes the test executed in both the first environment and the second environment;
introducing a pipe to connect the first and second environments to the third environment;
automatically propagating, using one or more processors, the latest version of the deliverable from the first and second environments to a third environment within the pipeline based on the detection of the first and second versions of the deliverable; and
causing display of the propagation of the deliverable in a user interface.

18. A non-transitory computer-readable medium having instructions embodied thereon, the instructions executable by one or more processors to perform operations comprising:
automatically retrieving source code from a source code management system;
generating one or more environments, each environment including a resource;
packaging the retrieved source code into a deliverable that is propagated through a pipeline comprising the generated one or more environments including a first environment, a second environment, and a third environment;
determining that a first version of the deliverable from the first environment and a second version of the deliverable from the second environment each passes a test executed within their respective environments;
detecting that the first and second versions of the deliverable are both a latest version of the deliverable that passes the test executed in both the first environment and the second environment;
introducing a pipe to connect the first and second environments to the third environment;
automatically propagating the latest version of the deliverable from the first and-second environments to a third environment within the pipeline based on the detection of the first and second versions of the deliverable; and
causing display of the propagation of the deliverable in a user interface.

\* \* \* \* \*